(12) United States Patent
Maber

(10) Patent No.: US 8,928,502 B2
(45) Date of Patent: Jan. 6, 2015

(54) KEYBOARD AND METHOD TEXT ENTRY

(76) Inventor: Jonathan Maber, Leeds (GB)

( * ) Notice: Subject to any disclaimer, the term of this patent is extended or adjusted under 35 U.S.C. 154(b) by 1837 days.

(21) Appl. No.: 12/089,088

(22) PCT Filed: Oct. 5, 2006

(86) PCT No.: PCT/GB2006/003706
§ 371 (c)(1),
(2), (4) Date: Apr. 3, 2008

(87) PCT Pub. No.: WO2007/039746
PCT Pub. Date: Apr. 12, 2007

(65) Prior Publication Data
US 2008/0316065 A1 Dec. 25, 2008

(30) Foreign Application Priority Data

Oct. 6, 2005 (GB) .................................. 0520287.4

(51) Int. Cl.
H03M 11/00 (2006.01)
G06F 3/023 (2006.01)
G06F 3/02 (2006.01)

(52) U.S. Cl.
CPC ............ G06F 3/0235 (2013.01); G06F 3/0219 (2013.01)
USPC .......................................................... 341/23

(58) Field of Classification Search
CPC .............................. G06F 3/0235; G06F 3/0219
USPC .......................................................... 341/23
See application file for complete search history.

(56) References Cited

U.S. PATENT DOCUMENTS

| 4,661,005 | A | * | 4/1987 | Lahr | 400/489 |
| 5,006,001 | A | | 4/1991 | Vulcano | |
| 5,486,823 | A | * | 1/1996 | Tsai | 341/22 |
| 6,869,011 | B2 | * | 3/2005 | Mitchell | 235/145 R |
| 2003/0030573 | A1 | | 2/2003 | Ure | |
| 2003/0053695 | A1 | | 3/2003 | Kenagy | |
| 2004/0264690 | A1 | | 12/2004 | Coates | |
| 2005/0020323 | A1 | | 1/2005 | Kim | |
| 2006/0116135 | A1 | * | 6/2006 | Ure | 455/457 |

FOREIGN PATENT DOCUMENTS

| WO | 98/03905 A1 | 1/1998 |
| WO | WO0174133 | 10/2001 |
| WO | WO0179978 | 10/2001 |
| WO | WO02056167 | 7/2002 |
| WO | WO02082252 | 10/2002 |

* cited by examiner

Primary Examiner — Rexford Barnie
Assistant Examiner — Tien Mai
(74) Attorney, Agent, or Firm — Kirton McConkie; Evan R. Witt

(57) ABSTRACT

A keyboard for entry of text characters is described. The keyboard comprises: a plurality of keys and a processing means for detecting when at least one of the plurality of keys is pressed. Each of the plurality of keys has an indicia marked on its surface. When the processor detects that two or more of the plurality of keys have been pressed within a predetermined time period of each other, data corresponding to a text character visually resembling the combination of the indicia marked on the two or more of the plurality of keys is output. A corresponding method of text entry is also described. The output from the keyboard visually resembles the combination of the indicia on the keys. This enables a user to use the keyboard without requiring special training, or to learn particular key combinations.

7 Claims, 10 Drawing Sheets

| | | |
|---|---|---|
| ~ | Space | |
| ╱ | Backspace | |
| ⊃ | Return, Enter | |
| ⊂∩ | Shift | (Latch > Lock > Release) |
| ⊂∪ | Control | (Latch > Lock > Release) |
| ⊂∪╱ | Alt | (Latch > Lock > Release) |
| ╱⊃ | Punctuation | (Comma > Apostrophe > Question) |
| ǀǀ | Accent or modify char to left. | |
| ǀǀ∩ | Mode up | (Alpha > Numeric > Symbol > Cursor) |
| ǀǀ∪ | Mode down | (Alpha < Numeric < Symbol < Cursor) |
| ~⊃ | Escape | |
| ⊂ǀ⊃ | TAB | |

| Symbol | Char | Description | Symbol | Char | Description |
|---|---|---|---|---|---|
| l/ | £ | crossed L | / | / | |
| S | $ | | /U\ | | u indicates rotation |
| p | % | p for percent | ~ | ~ | |
| n | ^ | points up | h | # | h for hash |
| a | & | a for ampersand | l | \| | vertical bar like I |
| ⚹ | * | | lU | _ | u indicates rotation |
| l/ | + | skewed plus | lU | - | u indicates rotation |
| c | ( | | ɇ | € | e for euro |
| ɔ | ) | | o | ° | |
| q̧ | = | eQuals | Я | ® | |
| an | @ | encircled a | t | ™ | t for trademark |
| m | µ | m for micro | ǵ | ` | g for grave |

Fig. 8

| ⊂ | Left |
| ⊃ | Right |
| ∩ | Up |
| ∪ | Down |
| ╱ | Backspace |
| ∣ | Insert |
| ∣⊂ | Home |
| ∣⊃ | End |
| ∣∩ | Page Up |
| ∣∪ | Page Down |
| ∣╱ | Delete |

Fig. 9

| | | |
|---|---|---|
| ⊿∩ | å | scandinavian languages |
| ⊃/⊂ | æ | scandinavian languages |
| ⊂O | © | |
| /D | Ð | icelandic |
| I/ | ł | polish |
| ∩~ | ñ | spanish |
| O~ | õ | portuguese |
| OI | ø | scandinavian languages |
| I~/ | þ | icelandic |
| ω/ | ŵ | welsh |
| y~ | ŷ | welsh |

Fig. 10

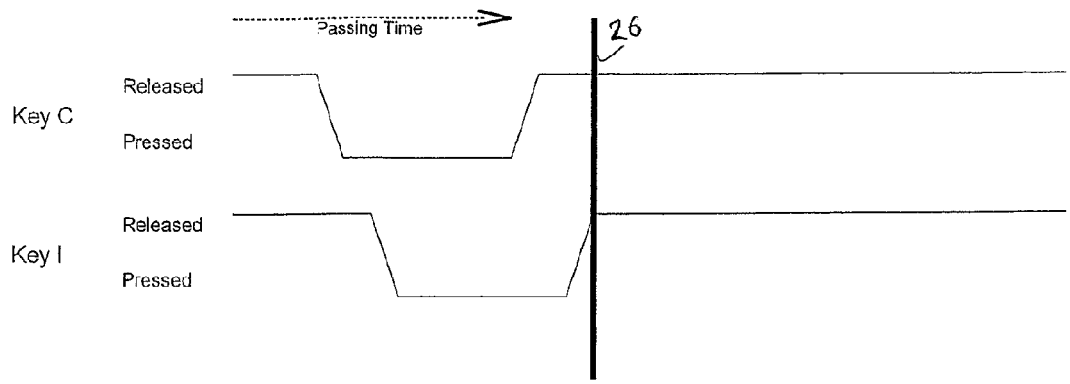
Figure 12a –
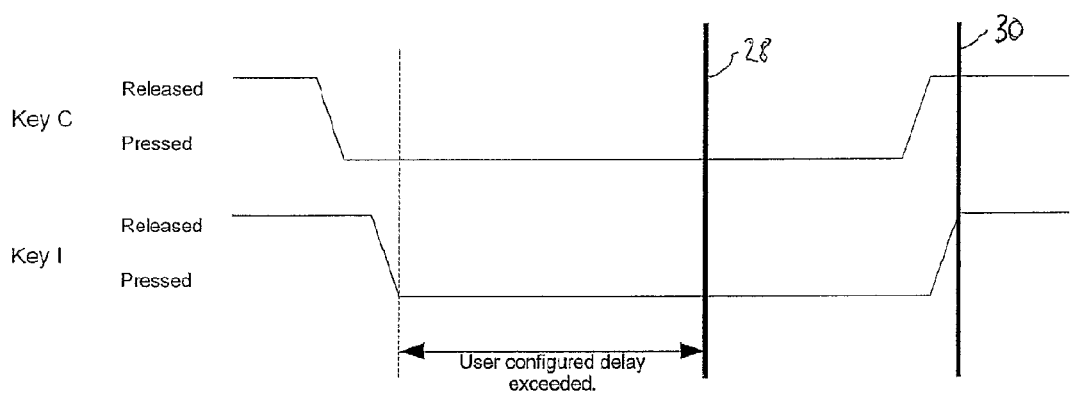
Figure 12b –
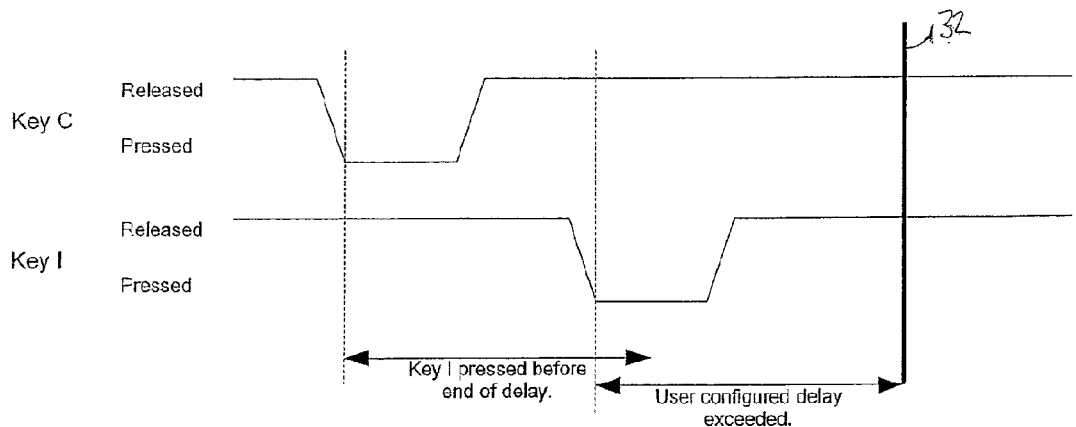
Figure 12c –

KEYBOARD AND METHOD TEXT ENTRY

The present invention relates to keyboards and methods of text entry and in particular to a keyboard having relatively few keys and methods of text entry using such a keyboard.

The traditional typewriter keyboard, often referred to in its English layout as the QWERTY keyboard, contains one key for each letter of the alphabet and number. However, this leads to a large number of keys and makes the keyboard unsuitable for miniature applications.

Keyboards having less keys than the number of letters and numbers of the alphabet are also known, such as keyboards for stenography. However, use of these keyboards requires extensive training because the output from the keyboard cannot be determined by examining the keys, alone. Combinations of keys also typically do not correspond to individual letters, in order to allow a stenographer to enter text at the rate at which it is spoken, for example in court reporting applications.

Braille keyboards, typically having six keys, are also known. A user of braille keyboard presses combinations of keys corresponding to the braille representation of a character or number. A braille keyboard can only be used by a user who is familiar with the braille alphabet and the majority of letters require several keys to be pressed simultaneously, which can be difficult for a user and slow down input using the keyboard. A number of key combinations use non-adjacent fingers and are uncomfortable to operate.

The present invention provides a keyboard comprising keys which each have an indicia or symbol marked on their surface. The symbol indicates the character that is entered when a key is pressed. When a combination of keys is pressed, the combination of the indicia visually resembles the character which is entered.

It is therefore possible to enter all the characters of the alphabet without requiring as many keys as there are letters in the alphabet. There is no need for a user to learn complex key combinations because the required combination can be deduced simply by looking at the indicia marked on the key. This allows the keyboard to be used without special training.

According to a first aspect of the present invention, there is provided a keyboard for entry of text characters, the keyboard comprising:
- a plurality of keys, wherein each of the plurality of keys has an indicia marked on its surface; and
- processing means for detecting when at least one of the plurality of keys is pressed and for outputting data corresponding to an alphanumeric character;
- wherein when the processor detects that two or more of the plurality of keys have been pressed within a predetermined time period of each other, data corresponding to a text character visually resembling the combination of the indicia marked on the two or more of the plurality of keys is output.

The processing means may be a microprocessor, Application Specific Integrated Circuit (ASIC), Field Programmable Gate Array (FPGA), or a computer system. The data corresponding to an alphanumeric character may be a standard keyboard scan code.

The output from the keyboard visually resembles the combination of the indicia on the keys. This enables a user to use the keyboard without requiring special training, or to learn particular key combinations.

In use, a user may not be able to press keys precisely simultaneously. By monitoring for presses within a predetermined time period, errors are reduced. The time period is preferably at least 250 ms, with longer periods, up to 10 s or more, suitable for some applications such as special needs keyboards.

The indicia marked on the surface of the plurality of keys preferably each represent a portion of an alphanumeric character, and wherein the indicia are chosen such that any letter of the alphabet can be formed from a combination of three or less of the indicia. It is therefore possible to enter any letter of the alphabet by simultaneously pressing no more than three keys.

Preferably, the number of keys is eight and in that case it is preferable for the keys to be arranged in first and second groups, with each group having four keys.

With such an arrangement of keys, the keyboard it is preferable that any keyboard function can be accessed by a combination of one, two or three keys, and wherein the keys are positioned such that when three keys are required, two of the three keys are located adjacent each other. By never requiring more than three keys to be pressed in combination the efficiency of text entry can be improved.

It is particularly preferable that the keys are positioned such that when three keys are required, the two of the three keys located adjacent each other are in the first group and the remaining key of the three keys is in the second group. It is therefore possible for a user to operate the keyboard using only two digits because the two adjacent keys can be pressed by the same digit.

In one embodiment, each group is contained in a separate housing, and each housing comprises a communication circuit for transmitting data indicating that a key has been pressed to the processor. This is particularly useful for mobile applications.

Preferably, at least the outline of the indicia marked on the surface of the plurality of keys is raised or recessed from the surface of the key. This enables the keyboard to be used when the indicia cannot be seen clearly and also enables use of the keyboard by blind people. Such a keyboard is particularly useful for people who were not born blind as such people often find it easier to visualise the shape of a letter rather than the braille pattern.

According to a second aspect of the invention, there is provided a method for converting keystrokes into character information, wherein the keystrokes are entered using a keyboard comprising a plurality of keys, each key having an indicia marked on its surface, the method comprising:
- detecting when keys are pressed on the keyboard by a user; and
- when it is detected that two or more of the plurality of keys are pressed within a predetermined time period of each other, outputting character information corresponding to a character which visually resembles the combination of the indicia marked on the two or more of the plurality of keys.

The predetermined time period is preferably at least 250 ms.

Embodiments of the invention will now be described by way of example with reference to the accompanying drawings, in which:

FIG. 4 depicts the combinations of keys to be pressed to access special characters and control codes;

FIG. 5 depicts the sequence of characters which is cycled through after an alphabetic character has been entered each time an accented or modified character key combination is pressed;

FIG. 6 depicts the sequence of characters which is cycled through after a symbolic or numeric character has been entered each time an accented or modified character key combination is pressed;

FIG. 7 depicts how one or two keys may be pressed to enter numeric characters when the keyboard is in numeric mode;

FIG. 8 depicts how one or more keys may be pressed to enter symbolic characters when the keyboard is in symbol mode;

FIG. 9 depicts how one or more keys may be pressed to move the cursor when the keyboard is in cursor mode;

FIG. 10 depicts how one or more keys may be pressed to enter additional characters when the keyboard is in alphabetic mode;

FIGS. 12A to 12C are timing diagrams illustrating how multiple keypresses within a predetermined period are interpreted by the present invention.

Figure 1:
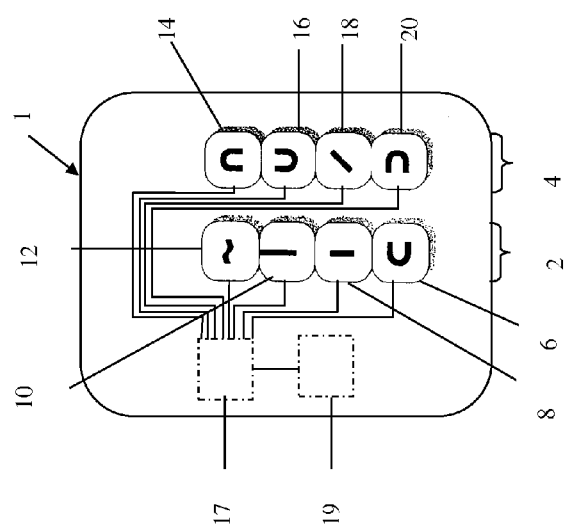
FIG. 1 depicts a diagrammatic representation of a keyboard according to a first embodiment of the present invention.
Figure 2A:
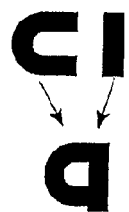
FIGS. 2A to 2K depict how two keys may be pressed to enter a character which visually resembles the combination of the indicia marked on the keys pressed.
Figure 2B:
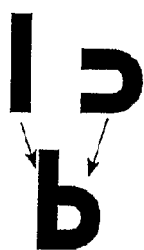
Figure 2C:
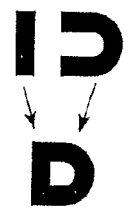
Figure 2D:
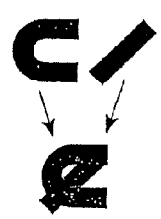
Figure 2E:
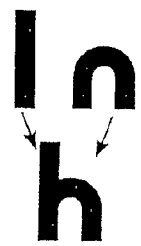
Figure 2F:
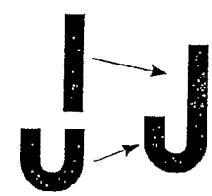
Figure 2G:
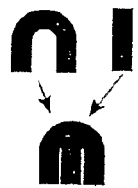
Figure 2H:
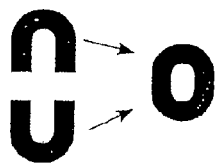
Figure 2I:
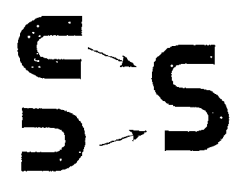
Figure 2J:
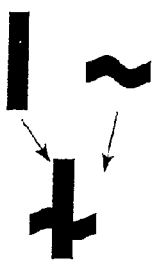
Figure 2J:
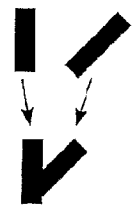
Figure 2J:
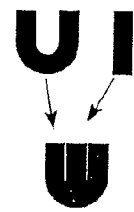
Figure 2J:
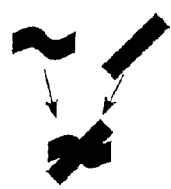
Figure 2K:
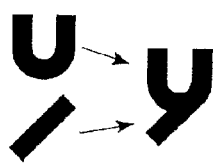
Figure 3A:
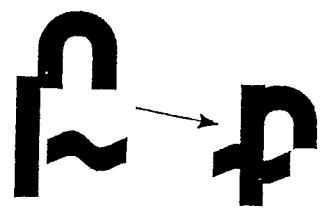
FIGS. 3A to 3G depict how three keys may be pressed to enter a character which visually resembles the combination of the indicia marked on the keys pressed.
Figure 3B:
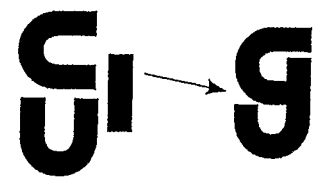
Figure 3C:
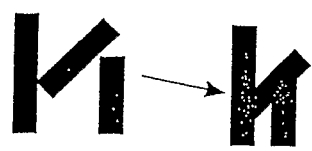
Figure 3D:
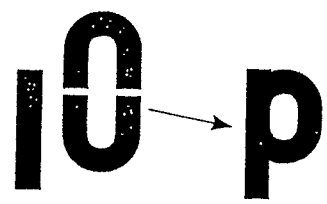
Figure 3E:
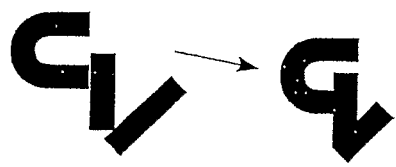
Figure 3F:
Figure 3G:
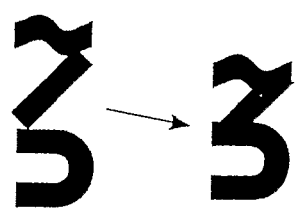

A diagrammatic representation of a keyboard according to a first embodiment of the invention is depicted in FIG. 1. The keyboard 1 comprises eight keys in total, arranged in two groups 2,4 each of which comprises four keys.

Each key has an indicia marked on its surface. In this embodiment the indicia are embossed on the surface of the key and also marked in a contrasting colour to allow use of the keyboard by identifying the keys by sight and/or touch. In alternate embodiments, the indicia may be in relief from the surface of the key or simply marked on the surface without any relief or embossing. In another alternate embodiment the indicia may be marked adjacent to the keys so that they are visible even when the keys are covered by a user's fingers. Four of the keys 6, 14, 16, 20 are marked with a sans serif U shape, with each sans serif U shape orientated so that its curved section is located on a bearing of 0°, 90°, 180° and 270°, with 180° corresponding to the normal orientation of a U shape in typographical layout. The other four keys 8, 10, 12, 18 are marked with one of: a short vertical bar, a long vertical bar, a forward slash, i.e. a "/" character, and a tilde.

In this embodiment the keyboard contains a processor 17 which receives input from each of keys indicating their present actuation state, i.e. pressed or not pressed. The processor 17 converts the key presses into data representing a particular character or control code in accordance with a standard character set, for example Unicode. The conversion is described in more detail below. A communications circuit 19 is connected to the processor 17. The communications circuit 19 transmits data representing the particular character or control code to a connected system. In this embodiment, the communications circuit 19 is for wired communication and meets the USB standard, although circuits meeting other communication standards may also be used in other embodiments, for example PS2 serial bus for wired connections and Bluetooth® for wireless connections.

The two groups 2, 4 of keys enable a user to use one hand with each group. With the layout of this embodiment, it is envisaged that the keyboard can be operated by two thumbs, with each group 2, 4 of keys operated by the thumb of one hand.

In use, the user enters text characters by pressing the key 6, 8, 10, 12, 14, 16, 18, 20, bearing an indicia that visually resembles the character to be input. Combinations of keys can also be pressed to allow other characters to be entered. When a combination of two or more keys is pressed, a character resembling the combination of the indicia marked on the keys is entered.

With a single key press, a user can directly enter the characters c (using key 6), i (using key 8), l (using key 10), n (using key 14) and u (using key 18). The user can also enter control codes for a space (using key 12), a backspace (using key 18) and the enter/return command (using key 20).

Using a combination of two keys, a user can enter the characters a, b, d, e, h, j, m, o, s, t, V, w, x and y. The keys which need to be pressed to enter these characters are depicted in FIG. 2A to FIG. 2K. It can be seen the letter entered visually resembles the combination of the indicia marked on the keys.

The remaining letters of the alphabet (f, g, k, p, q, r and z) are produced by a combination of three keys. The keys which need to be pressed to enter these characters are depicted in FIG. 3A to FIG. 3G. Once again, it can be seen the letter entered visually resembles the combination of the indicia marked on the keys.

The layout of the keys is arranged so that the more commonly used letters may be entered more easily than the less commonly used characters, improving the efficiency of the keyboard. A user can enter the letter c, i, l, n and u using only a single key press. The two keys which make up a, o, t and y are positioned adjacent one another, so that they can be entered using a single digit to press both keys.

In order to ensure that all characters may be entered easily, the keys are positioned so that when three keys are required to be pressed two of the keys are positioned adjacent each other. This allows a user to enter a character requiring three keys to be pressed using only two digits, since one digit may press two adjacent keys.

The keys are positioned in one of the groups 2, 4 to further improve the efficiency of text entry. For all the characters which require the use of two digits (two-key combination characters which do not use adjacent keys and three-key combination characters) the keys are positioned such that a user will activate either a single key in each of the groups 2,4 for a two-key combination, or two adjacent keys in one group and a single key in the other group for a three-key combination. It is therefore possible for a user to enter the full alphabet using only two digits, for example a thumb on each hand.

The processor is programmed with a look-up table which maps the key combinations described above to the actual text character. During use of the keyboard, the processor monitors the keys being pressed. When two or three keys are pressed simultaneously, the processor looks up the combination in the look-up table and outputs the corresponding text character.

It is possible that in some situations, two keys may be intended to be pressed simultaneously by a user but may be determined as being pressed a few milliseconds apart by the processor. To avoid the output of two or three text characters, each corresponding to a single key press, when a single character was intended by the user, the keyboard provides two operation modes, a first operation mode known as "immediate" and a second operation mode known as "delayed".

In immediate mode the user must press combinations of keys together. The key combination is translated to output character data, which may be a keyboard scan code, when either the last key is released or when a user configured period of time elapses (measured from the last key press) during which no more keys are pressed. This mode of operation is illustrated in FIGS. 12A and 12B.

FIG. 12A is a timing diagram for operation when the last key is released. The top portion shows the state of the key 6, or "c" and the lower portion the state of key 10 or "i". It can be seen that key for "c" is pressed before the key for "l" but that there is a portion of time when both keys are pressed together. Character code data, or a keyboard scan code, corresponding to a letter "a" is output at point 26, when both keys have been released. In actual fact at point 26 the keyboard generates an event which indicates an "a" key has been pressed immediately followed by an event which indicates that the "a" key has been released.

FIG. 12B is a timing diagram for operation in immediate mode when a user defined period of time elapses. As with FIG. 12A, the top portion indicates the state of key 6 or "c" and the lower portion the state of key 10 or "i". In the situation illustrated by FIG. 12B, the two keys are held down for a long period of time. Once a user defined predetermined delay has passed, at point 28, the keyboard generates an event which indicates that an "a" key has been pressed. Only when both keys have been released, at point 30, does the keyboard generate an event which indicates that the "a" key has been released.

Immediate mode is suitable for users who are physically able to press up to three keys at once using two thumbs, two fists, two feet or three of eight fingers etc. The timing system allows a user to generate a single 'simulated' key down event, held for any desired time and then generate a key up event some time later by releasing keys. This may be required for the operation of certain functionality other than simple text entry.

Delayed mode is more suitable for users who are unable to physically press multiple keys at once and can tolerate slower text entry. A timing diagram for delayed mode is depicted in FIG. 12C. Once again, the upper portion indicates the state of key 6 or "c" and the lower portion the state of key 10 or "l". In delayed mode, each key in a key combination is pressed and released before the next key is pressed and released as depicted in FIG. 12C. The combination is translated into character data or keyboard scan code when a user configurable predetermined period of time elapses. This period of time is measured from the last key press and is reset when a further key press is detected. When the period of time elapses with no further key presses detected (point 32 in FIG. 12C) key up, key down events are generated.

A dexterous user may set the user configurable periods or delays to 250 ms for fast one-thumb text entry. A user with severe disability may operate the keyboard with a head mounted pointer and set the timing to many seconds, for example 10 seconds.

The first embodiment as so far described can enter all the characters of the alphabet and control codes for "space", "enter" and "backspace". However, it is preferred for the keyboard to also be able to enter numeric characters, accented characters, punctuation characters, special characters (such as currency symbols) and additional control characters. FIG. 4 depicts the combinations of keys to enter these characters. The method of input depends on the character entered.

Referring to FIG. 4, the "Shift" and "Control" functions can be accessed by a two key combination and the "Alt" function can be accessed by a three key combination. Unlike a standard keyboard it is not possible for a user to simultaneously hold down the keys for "Shift", "Alt" and "Control" together with the keys to for the character which is to be modified. For this reason, a single press of the "Shift", "Control" or "Alt" combinations instructs the processor to enter a latched mode and await further key presses before outputting a text or control character. For example, to enter a capital A, a user would first press the key combination for "Shift" followed by the key combination for "a". The processor would output data corresponding to a capital "A" and then return to normal operation. A "Shift-lock", "Control-lock" and "Alt-lock" mode can be activated by pressing the key combination for "Shift", "Control" and "Alt" twice consecutively. The locked mode can then be exited by pressing the key combination a further time.

Accented or modified characters can be entered by pressing the keys 8, 10, marked with the long bar and the short bar, together. Each time the processor detects this key combination being pressed it outputs a backspace control code to delete the previous character that was output and then outputs the next accented or modified character in the lists depicted in FIG. 5. The order of characters in these lists are provided for a western hemisphere/western Europe locale. The order of characters may be varied for use in particular locales, for example in Germany the characters with an umlaut would occur near the start of the cycle rather than at the end.

Punctuation is entered by the combination keys 18, 20 marked with the forward slash and the 90° oriented U. The punctuation entered depends on the number of times the combination is pressed consecutively. One press enters a comma, two presses enter an apostrophe and three presses enter a question mark. Further punctuation is then available by pressing the accented or modified key combination described above to cycle through characters depicted in FIG. 6, starting with a comma, apostrophe or question mark.

Numeric characters and symbols are entered by switching the operation mode of the keyboard using the combination of keys 8, 10 and 14 to cycle through alphabet mode (to enter letters of the alphabet as described above), numeric mode (to enter numbers), symbol mode (to enter symbols) and cursor mode (to enable movement of the cursor). The combination of keys 8, 10 and 16 cycles through the modes in the opposite direction (i.e. alphabet mode, cursor mode, symbol mode, numeric mode).

Figures 6, 7:
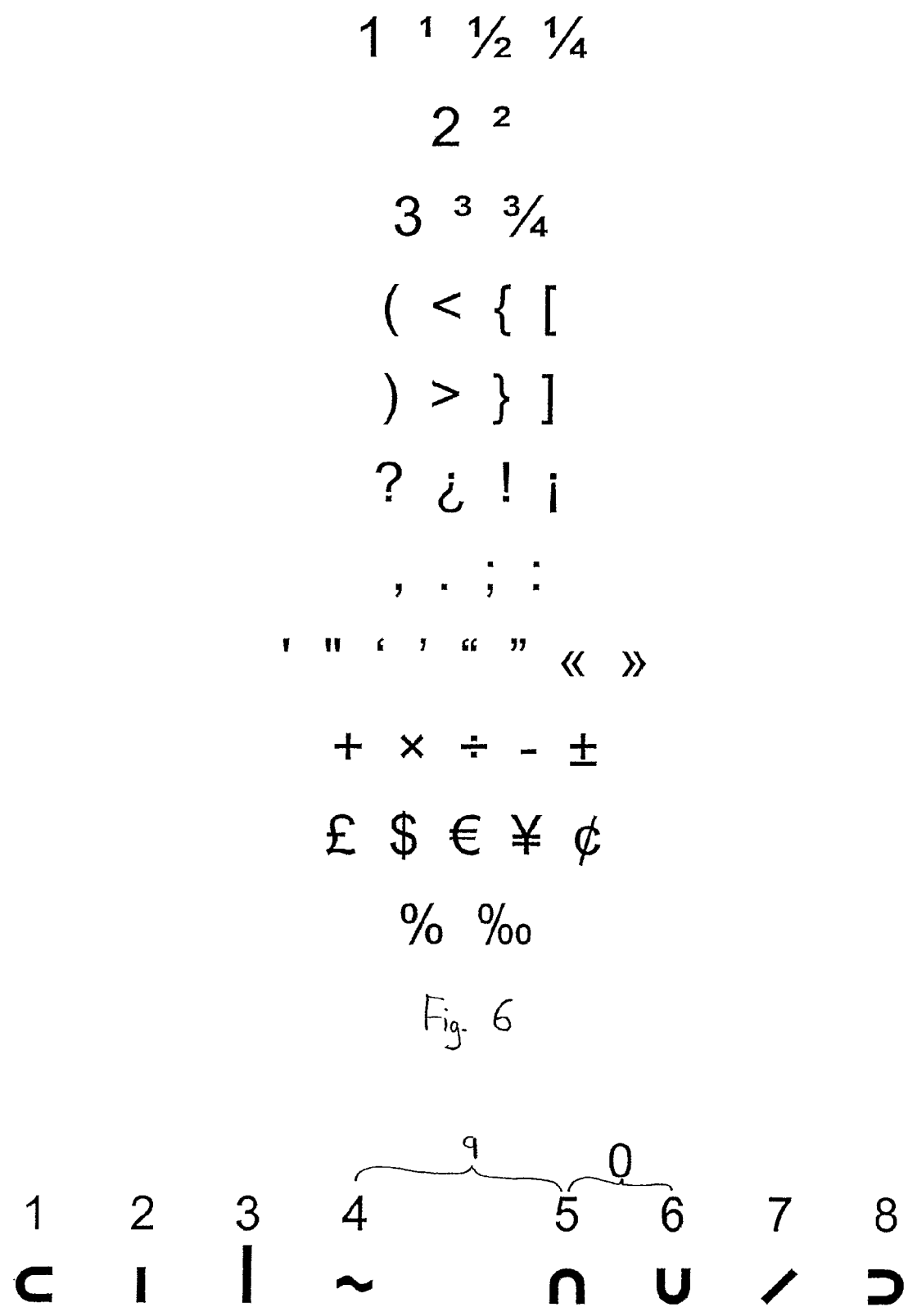

When the keyboard is in numeric mode, the mapping between key presses and numbers is depicted in FIG. 7. The digits 1 to 8 are assigned to the keys in order starting from key 6, ("c") and moving clockwise around the keyboard to enable a user to easily determine the key allocations. The digits 1, 2 and 3 may also be modified into common superscript forms and fractions using the accented or modified character key combination described above. The digit 9 is produced by pressing keys 12 and 14 together. This combination can be easily remembered because keys 12 and 14 correspond to the digits 4 and 5 which add up to 9. The digit 0 is produced by pressing keys 14 and 16 together. This combination can be easily remembered because the indicia on the keys joined together form the shape "0".

When the keyboard is in symbol mode, the mapping between key combinations and symbols is depicted in FIG. 8. To assist the user, the combination of the indicia on the keys to be pressed either resembles the symbol itself or can be logically associated with the symbol. For example to enter an "®" symbol, the key combination visually resembles an "R" and to enter an ampersand (&) the key combination resembles an "a" for ampersand. The reasoning behind the selection of each mapping is given in FIG. 8. Some of the symbols may also be modified using the accented or modified character key combination described above. (Those symbols which can be modified in this way are depicted in FIG. 6).

When the keyboard is in cursor mode, the mapping between keys and cursor actions is depicted in FIG. 9.

In order to ensure that all characters and control codes defined in the Basic Latin, Latin-1 Supplement and Latin Extended-A blocks of the Unicode character set are easily available, some symbols can be entered when the keyboard is in alphabetic mode. These symbols generally correspond with special letters used by certain languages. The mapping from keys pressed to these symbols is depicted in FIG. 10.

The program for the processor is stored in a ROM in this embodiment. Alternatively, the processor, its software and the look-up table may all be implemented in a single Application Specific Integrated Circuit (ASIC).

The above described embodiment enables full keyboard functionality to be delivered using only eight keys. The keyboard can be easily operated because the indicia marked on the keys visually resemble the character which will be entered when the keys are pressed in isolation or in combination of up to three keys. A further benefit is that the keyboard is operated using combinations of only one, two or three keys. Furthermore, all the three key combinations used can be operated with only two digits, because two of the keys in every three key combination used are located adjacent each other and therefore can be pressed with only a single digit.

In an alternate embodiment, the processor may be located external to the keyboard. For example the processor may be the CPU of a computer system which runs a software program to convert the key presses into output characters.

In an alternate embodiment, other indicia may be marked on the keys of the keyboard. This may involve replacing the symbols with similar ones, for example the "~" with a "-" and the U-shaped characters with V-shaped characters.

Figure 11:
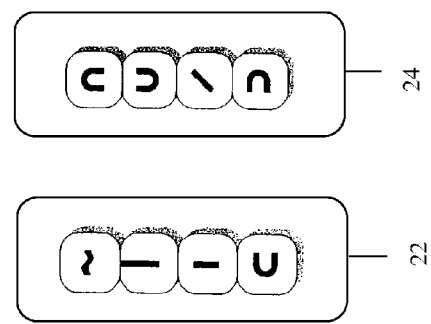
FIG. 11 depicts an alternative embodiment of the keyboard of the present invention.

In a further alternate embodiment of the keyboard, each group of keys may be provided in a separate housing 22, 24, as depicted in FIG. 11. The two housings could then be provided in a form which allows one housing to be used in each hand, for example ring-mounted keyboards for mobile computing.

In yet another alternate embodiment the groups of keys may be provided horizontally next to each other so that the keys form a single horizontal line and can be operated with one finger assigned to each key.

The invention claimed is:

1. A keyboard for entry of text characters, the keyboard comprising:
    eight keys, wherein the keys are arranged in first and second groups, with each group having only four keys, and wherein each of the keys in the first and second groups has an indicia marked on its surface, each indicia representing a portion of an alphanumeric character, and wherein the indicia are chosen such that all letters of the alphabet are formed from a combination of three or less of the indicia; and
    processing means for detecting when at least one of the plurality of keys is pressed and for outputting data corresponding to an alphanumeric character;
    wherein when the processor detects that two or more of the plurality of keys have been pressed within a predetermined time period of each other, data corresponding to a text character visually resembling the combination of the indicia marked on the two or more of the plurality of keys is output, and wherein all keyboard functions are accessed by a combination of one, two or three keys, and wherein the keys are positioned such that when three keys are required, two of the three keys are located adjacent each other.

2. A keyboard according to claim 1, wherein the predetermined time period is at least 250 ms.

3. A keyboard according to claim 1, wherein the keys are further positioned such that when three keys are required, the two of the three keys located adjacent to each other are in the first group and the remaining key of the three keys is in the second group.

4. A keyboard according to claim 1, wherein each group is contained in a separate housing, and each housing comprises a communication circuit for transmitting data indicating that a key has been pressed to the processor.

5. A keyboard according to claim 1, wherein at least the outline of the indicia marked on the surface of the plurality of keys is raised or recessed from the surface of the key.

6. A keyboard according to claim 3 wherein each group is contained in a separate housing, and each housing comprises a communication circuit for transmitting data indicating that a key has been pressed to the processor.

7. A keyboard according to claim 1, wherein when two keys are required either one of the two keys is in the first group and the other of the two keys is in the second group or the two keys are located adjacent each other.

* * * * *